(12) United States Patent
Downes

(10) Patent No.: US 6,572,193 B2
(45) Date of Patent: Jun. 3, 2003

(54) SEAT FOR AN AGRICULTURAL VEHICLE

(75) Inventor: Kevin W. Downes, Essex (GB)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/144,548

(22) Filed: May 13, 2002

(65) Prior Publication Data
US 2002/0125754 A1 Sep. 12, 2002

Related U.S. Application Data

(62) Division of application No. 09/702,340, filed on Oct. 31, 2000.

(30) Foreign Application Priority Data

Nov. 1, 1999 (GB) .......................................... 99257750

(51) Int. Cl.[7] ................................................ A47C 1/02
(52) U.S. Cl. ................. 297/335; 297/16.1; 108/134; 296/63
(58) Field of Search .................... 297/14, 16.1, 60, 297/42, 233, 217.7, 335; 108/134; 296/63, 65.1

(56) References Cited

U.S. PATENT DOCUMENTS 3,249,073 A * 5/1966 Gorham ..................... 108/134
3,285,206 A * 11/1966 Hoffman .................... 108/134
4,359,243 A * 11/1982 Crutcher .................... 297/16.1
4,632,457 A * 12/1986 Hofrichter et al. .......... 297/335
5,364,151 A * 11/1994 Yurasits ..................... 296/65.1
5,374,106 A * 12/1994 Hoefer ....................... 297/236
5,797,649 A * 8/1998 Snell, Jr. et al. .............. 297/14

* cited by examiner

Primary Examiner—Peter M. Cuomo
Assistant Examiner—Stephen Vu
(74) Attorney, Agent, or Firm—Larry W. Miller; John William Stader

(57) ABSTRACT

A folding seat is provided for the cab of an agricultural vehicle. The seat is provided with a mounting bracket secured by bolts to an inclined-horizontal surface in the cab, such as part of the wheel arch. A seat member is pivotably mounted at its rear end on the mounting bracket for pivotal movement between a horizontal operative position and an inclined storage position in which the seat member lies against the mounting bracket. A stay is mounted to pivot between an operative position in which it extends vertically from the mounting bracket to the seat member in order to support the weight of the seat member on the mounting bracket and a storage position in which it lies between the mounting bracket and the seat member.

6 Claims, 5 Drawing Sheets

SEAT FOR AN AGRICULTURAL VEHICLE

This is a divisional of application Ser. No. 09/702,340, filed Oct. 31, 2000.

BACKGROUND OF THE INVENTION

The present invention relates to a passenger seat for the cab of an agricultural vehicle, such as a tractor or a combine harvester.

Though an agricultural vehicle is ordinarily only driven by one person, it is on occasions necessary for a passenger to accompany the driver. This may for example occur when a new driver is under instruction. As the cabs of agricultural vehicles normally have only one seat, the passenger must crouch in an uncomfortable position in order not to interfere with the driver's control of the vehicle nor with his visibility.

As there is insufficient space in the cab of an agricultural vehicle for a permanent passenger seat, it has previously been proposed to provide a folding seat in the driver's cab. Furthermore, known folding seats require a complicated two handed operation to effect the operation of raising and folding the seat.

European Patent Publication No. A-0 430 905 discloses a folding seat that can be fitted to a wheel arch or mudguard. A seat cushion is attached to the wheel arch by a U-shaped stay that can pivot relative to the seat cushion at one end and relative to the mudguard at the other end. The seat can be moved between a raised horizontal position in which it can be used by a passenger and a lowered vertical position in which it can be stored without obstructing the driver. In the raised position, the seat rests on the top of the wheel arch, which takes the weight of the passenger and is held in this position by means of a screw which fits in a threaded bush in the mudguard.

Another known folding seat for the cab of an agricultural vehicle is described in European Patent Publication No. A-0 646 492. This seat again requires the cab to have a structure defining a horizontal support surface. The seat cushion is formed in two halves that are hinged to one another, allowing the seat cushion to be folded in two. The front end of the seat cushion is pivotably attached to a stay, the other of which is pivotably mounted on the side of the wheel arch. In its storage position, the two halves of the seat cushion are folded over one another and they are stacked above the top of the wheel arch. The seat cushion does not protrude beyond the horizontal surface and does not therefore inconvenience the driver. To enable the seat to be used, the cushion is unfolded so that one half rests on the horizontal support surface and the other half projects from it and is support by the angled stay.

SUMMARY OF THE INVENTION

It is an object of this invention to provide a folding seat for the cab of an agricultural vehicle which has a stay pivotable between an operative position in which it extends vertically from the mounting bracket to the seat member in order to support the weight of the seat member on the mounting bracket and a storage position in which it lies between the mounting bracket and the seat member.

It is a feature of this invention that the stay is pivotably secured to the underside of the seat member and lies flat against the underside of the seat member in the storage position.

It is an advantage of this invention that a spring may bias the stay away from the underside of the seat member into the operative position, in which the plane of the stay is normal to that of the underside of the seat member. A stop projecting from the underside of the seat member may be provided to limit the movement of the stay under the action of the spring and thereby prevent the stay from overshooting its operative position.

For safety, it is desirable to provide the mounting bracket with a ramp surface over which the stay must ride prior to reaching the vertical operative position. This is in order to prevent the stay from being accidentally dislodged when the seat is in use.

An operating handle may conveniently be secured to the stay to project forward from the underside of the seat member, to ease manipulation of the stay while the seat is being folded away.

It is also preferred to provide a spring clip and ball stud for retaining the seat member against the mounting bracket when in the storage position.

The mounting bracket may conveniently comprise a first plate, to be mounted on a non-horizontal surface in the cab, and a second plate having an inverted "L" shape secured to or formed integrally with the first plate, the second plate having a horizontal limb connected along its rear edge to the upper edge of the first plate and a vertical limb extending downwards from the front edge of the horizontal limb towards the first plate.

It is further preferred for the lower end of the first plate to be bent upwardly to form a flange having a recess for receiving and locating the stay in its operative position.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

In a tractor, it is common for all the primary controls to be situated on the right hand side of the cab. The left side door is the side commonly used for entry into the cab and it is also on this side of the cab that it is preferred to mount a passenger seat. The passenger seat needs to be foldable in order not to restrict access to the cab from the left side door and also to allow for leg clearance when the driver's seat is rotated to the left.

Figure 1:
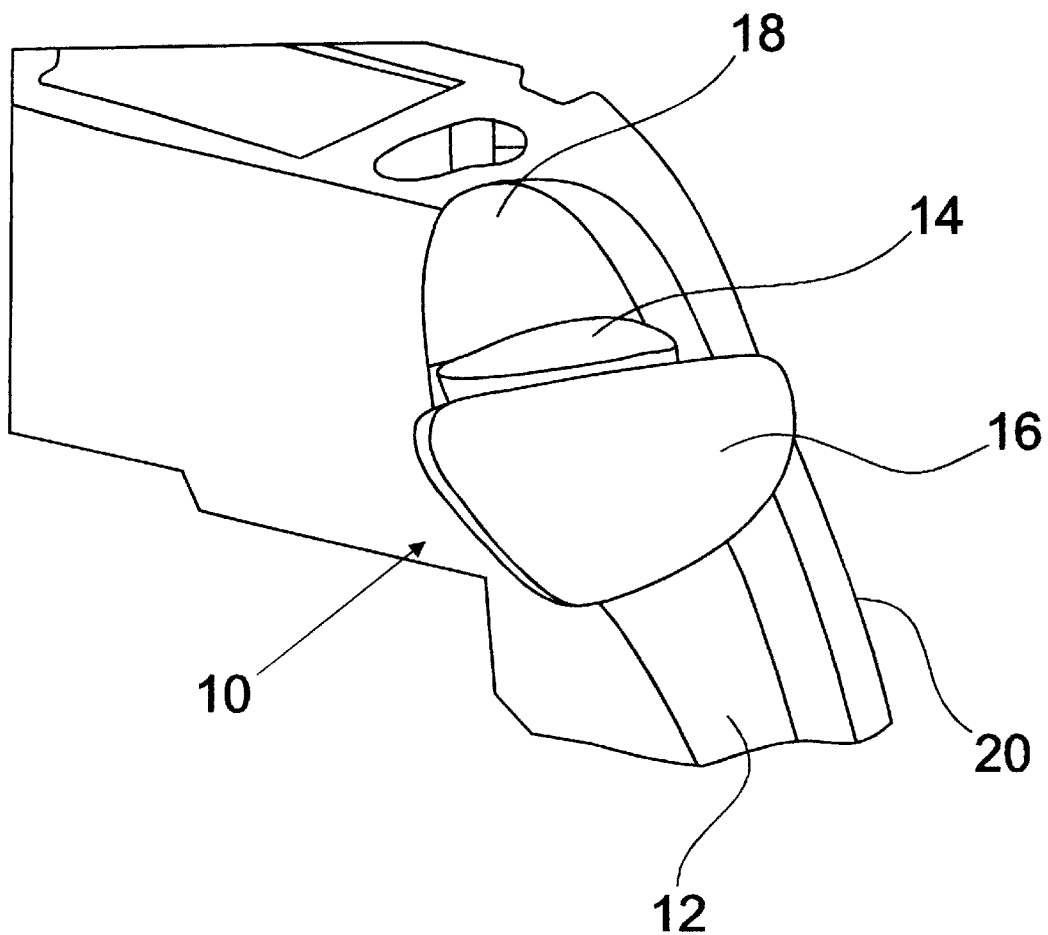
FIG. 1 is a perspective view showing the folding seat in its storage position.

FIG. 1 shows a folding seat 10 of the invention mounted on an inclined surface 12 in a cab of an agricultural vehicle. The inclined surface 12 in the drawing is the front of the arch that fits over the left rear wheel.

Figure 2:
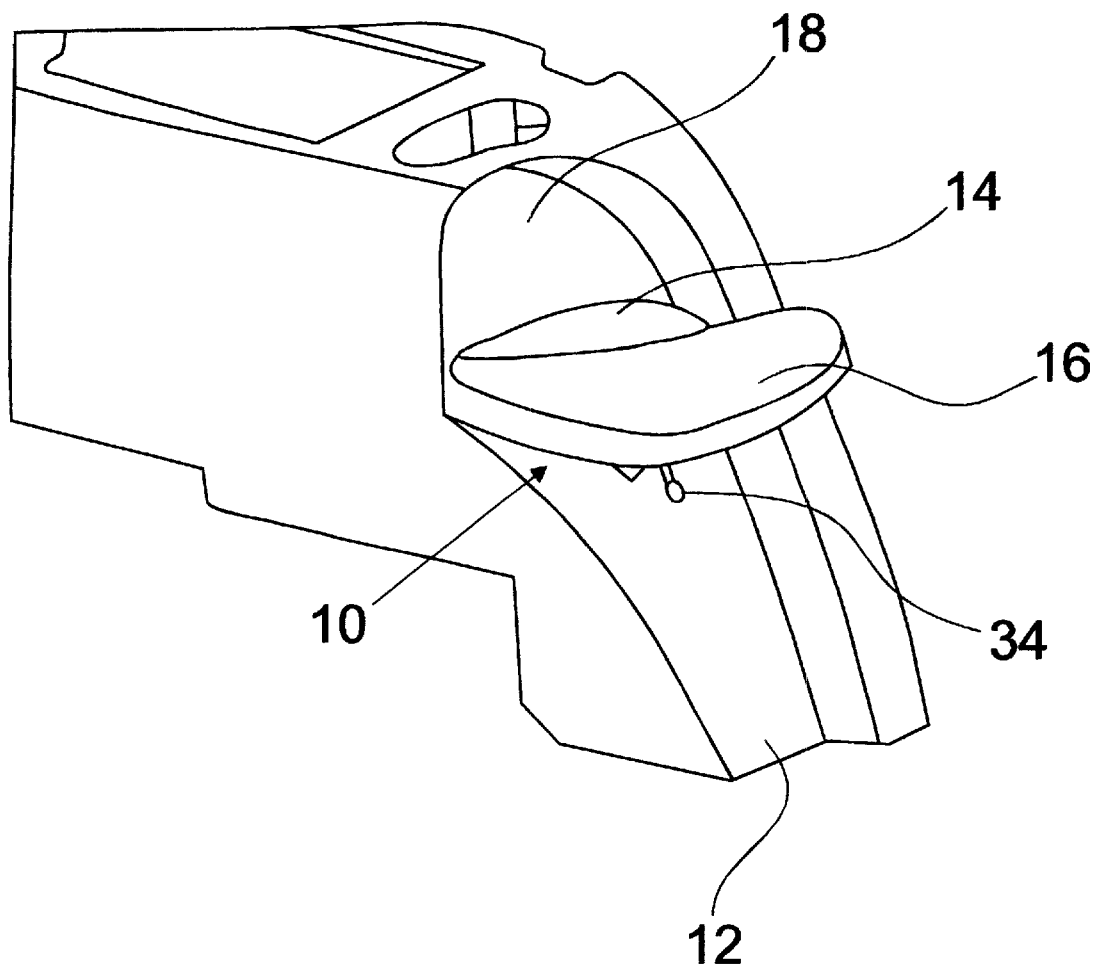
FIG. 2 is a perspective view showing a folding seat of the invention in its operative position.

The seat 10 is formed of two padded or contoured seat members 14 and 16 of which the smaller member 14 is permanently mounted in a horizontal attitude on the inclined surface 12 and the larger member 16 is pivotable between a lowered inclined storage position shown in FIG. 1 and a horizontal operative position shown in FIG. 2. In the operative position, the seat can support the weight of a passenger.

The seat 10 is mounted next to a suitably contoured surface 18 which provides a degree of back support to the passenger.

As the wheel arch forms part of the frame 20 of the left hand door, it is important to note that in the storage position the seat does not protrude significantly from the wheel arch with the result that it does not present a serious obstruction to the driver while entering the cab nor while sitting in the driver's seat.

Figure 3:
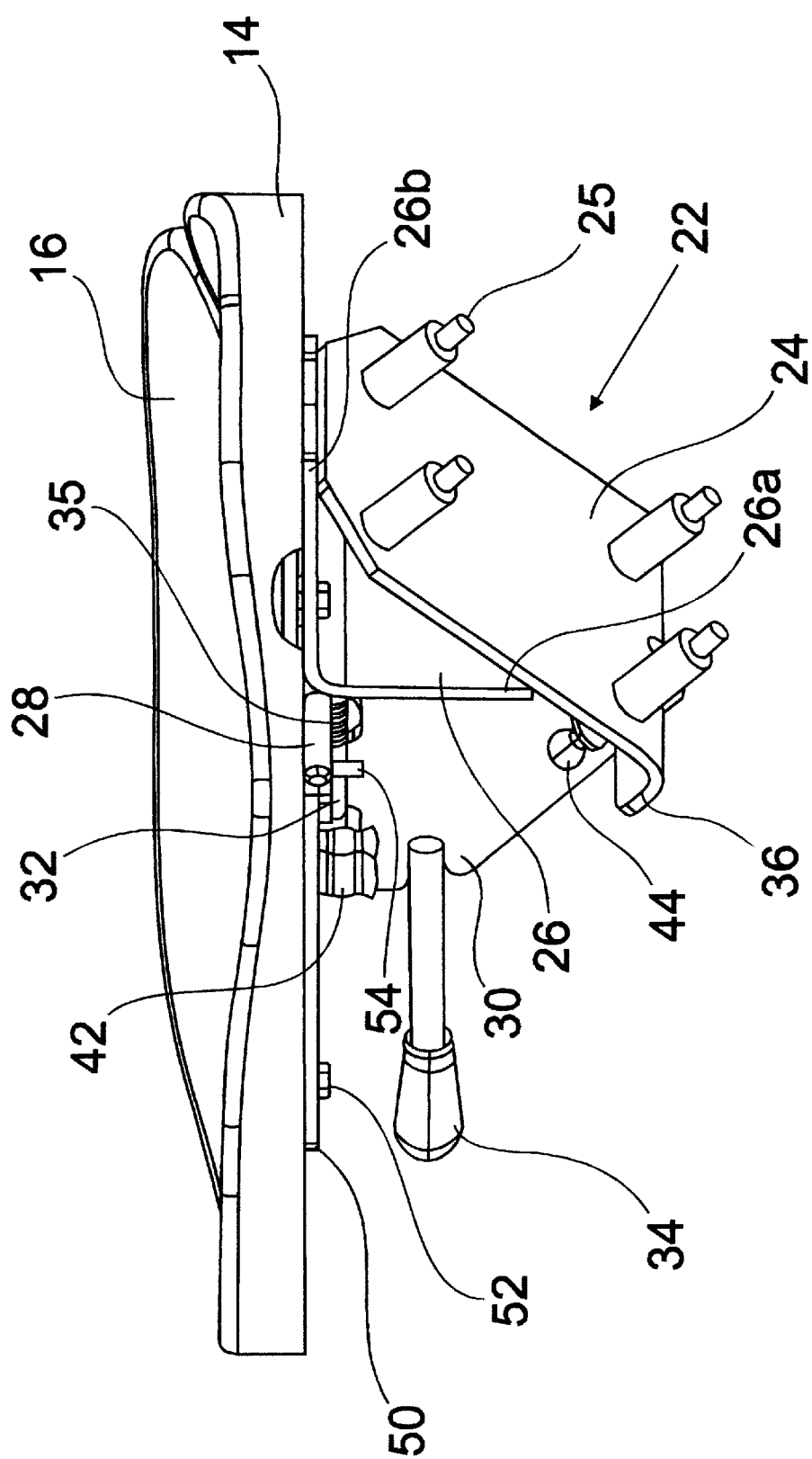
FIG. 3 is a perspective view from below and one side of the folding seat in its operative position.
Figure 4:
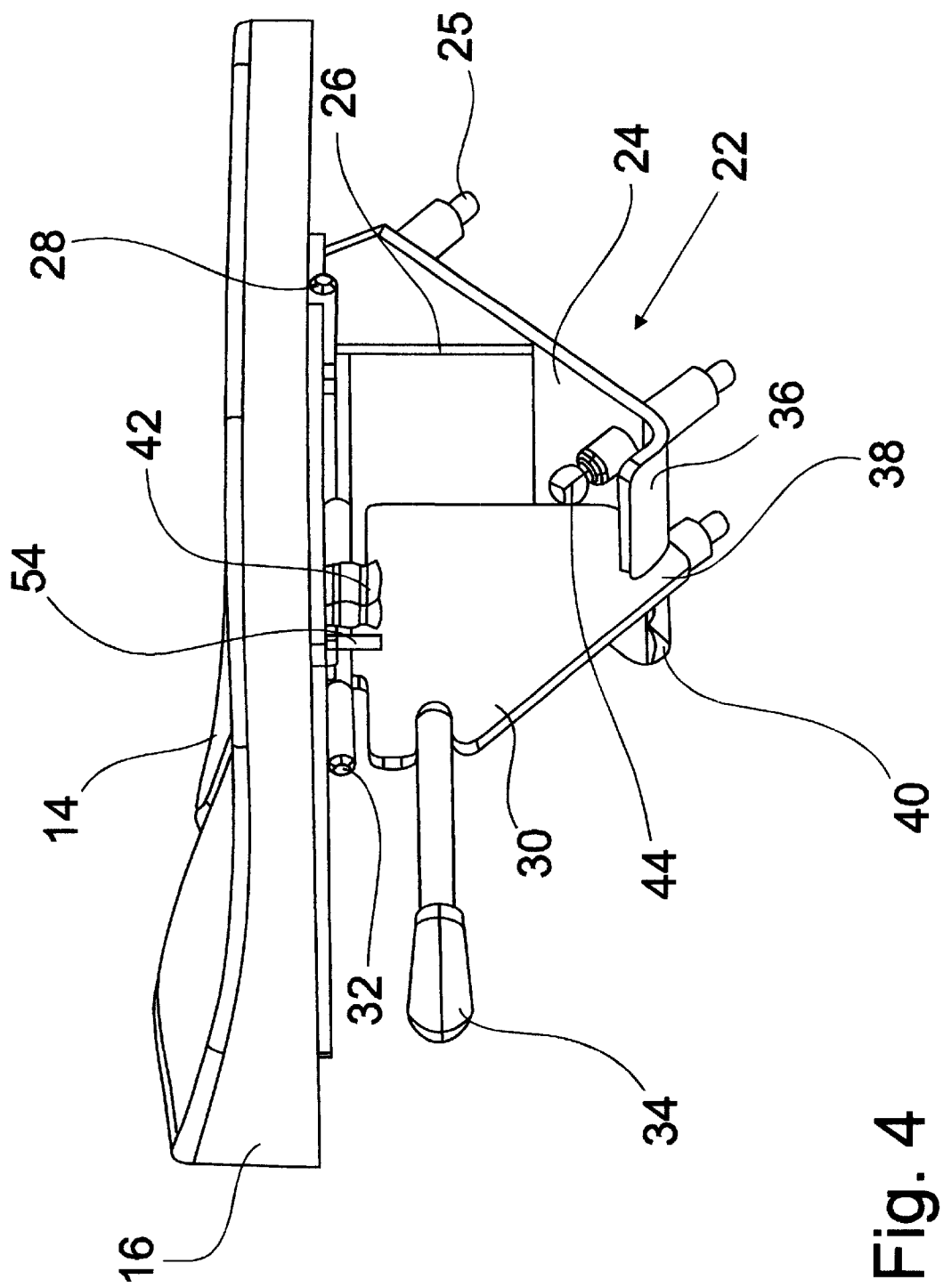
FIG. 4 is a perspective view from below and the other side of the folding seat in its operative position.
Figure 5:
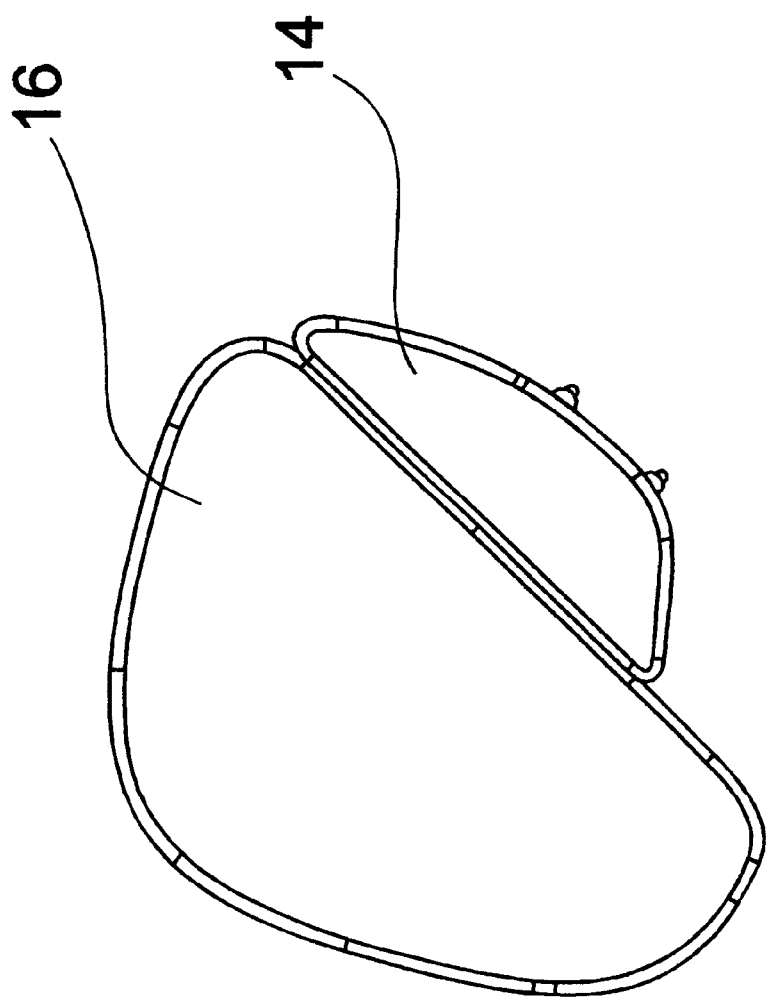
FIG. 5 is a plan view of the folding seat in its operative position.

Referring now to FIGS. 3 and 4, it will be seen that both seat members 14 and 16 are mounted on a bracket 22 that comprises a first plate 24 that is secured to the wheel arch by means of bolts 25. When mounted, this plate is not horizontal. The bracket 22 also includes a second plate 26 in the shape of an inverted "L" that is welded to the plate 24 though it may alternatively be formed integrally with the first plate 24 by appropriately bending a single sheet of metal.

The second plate 26 has a horizontal limb 26b and a vertical limb 26a. The horizontal limb 26b is welded at its rear edge to the upper edge of the plate 24 and supports the smaller of the two seat members 14. At its front edge, the horizontal limb 26b is attached by means of a hinge 28 to the rear edge of a metal plate 50 secured by bolts 52 to the underside of the larger seat member 16. The vertical limb 26a of the second plate 26 extends downwards from the front edge of the horizontal limb 26b to rest on the plate 24.

The larger pivotable seat member 16 is held in its operative position shown in FIG. 3 and 4 by means of a generally triangular stay 30 having a forwardly projecting operating handle 34. The stay is mounted on the underside of the seat member 16 for pivotal movement about a hinge 32 that is perpendicular to the hinge 28. A torsion spring 35 fitted around the hinge 32 biases the stay 30 towards its vertical position, shown in FIGS. 3 and 4. A stop 54 projects from the underside of the seat member 16 to limit the pivotal movement of the stay 30 so that it should not overshoot its vertical position. The stop may either be secured to the metal plate 50 or be constituted by a tab bent out of the metal plate.

The lower end of the plate 24 is formed with an upwardly bent flange 36 that acts as a means for locating the stay 30, in its operative position. The flange 36 has a central cut-out 38 in which the stay is held when in its operative position, as shown in FIG. 4. The part of the flange 36 to the right of the stay 30, as viewed, serves merely as a stop while the part to the left has a ramped front edge 40 that serves to guide the stay as the seat is being raised.

A spring clip 42 on the underside of the larger seat member and a ball stud 44 on the plate 24 serve to hold the seat member 16 in its folded position to prevent it from rattling.

The described seat has the advantage that it can be both raised and lowered by the driver in a very simple manner and while using only one hand. To raise the seat from its storage position, the driver needs only to pull the seat member 16 upwards until it overshoots the horizontal position slightly then to release it. The initial force meets with some resistance as the spring clip 42 separates from the ball stud 44. The stay 30 then pivots anti-clockwise as viewed about the hinge 32 under the action of its own weight and the torsion spring 35. As the seat member 16 is raised beyond its horizontal position, the lower edge of the stay 30 rides over the ramp surface 40 until it reaches the recess 38. When the seat member 16 is then released, the stay 30 drops into the recess and is firmly retained on both sides to provide strong support for the seat member 16.

To fold the seat away, the driver holds the handle 34 and raises it to disengage the stay 30 from the recess 38. The driver then bends the stay 30 about its hinge 32 against the action of the spring 34 until it lies against the underside of the seat member 16. At this time, the seat member 16 can be lowered about the hinge 28 into its storage position and pushed down firmly to engage the spring clip 42 on the ball stud 44.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an agricultural vehicle having a mobile frame and an operator cab supported on said frame for locating operative controls for the agricultural vehicle, a folding seat in combination with the agricultural vehicle comprising:

a mounting bracket, means for securing the mounting bracket to a non-horizontal surface in the cab, a seat member pivotably mounted at a rear end on the mounting bracket for pivotal movement between a horizontal operative position and an inclined storage position in which the seat member lies against the mounting bracket, a stay pivotably secured to the underside of the said seat member and pivotable between an operative position in which said stay extends vertically from the mounting bracket to the seat member in order to support the weight of the seat member on the mounting bracket and a storage position in which said stay lies flat against the underside of the seat member, a spring provided to bias the stay away from the underside of the seat member into the operative position, and a stop projecting from the underside of the seat member is provided to limit the movement of the stay under the action of the spring and thereby preventing the stay from overshooting the operative position.

2. In an agricultural vehicle having a mobile frame and an operator cab supported on said frame for locating operative controls for the agricultural vehicle, a folding seat in combination with the agricultural vehicle comprising:

a mounting bracket, means for securing the mounting bracket to a non-horizontal surface in the cab, a seat member pivotably mounted at a rear end on the mounting bracket for pivotal movement between a horizontal operative position and an inclined storage position in which the seat member lies against the mounting bracket, a stay pivotable between an operative position in which said stay extends vertically from the mounting bracket to the seat member in order to support the weight of the seat member on the mounting bracket and a storage position in which said stay lies between the mounting bracket and the seat member, and the mounting bracket is provided with a ramp surface over which the stay must ride prior to reaching the vertical operative position.

3. In an agricultural vehicle having a mobile frame and an operator cab supported on said frame for locating operative controls for the agricultural vehicle, a folding seat in combination with the agricultural vehicle comprising:

a mounting bracket, means for securing the mounting bracket to a non-horizontal surface in the cab, a seat member pivotably mounted at a rear end on the mounting bracket for pivotal movement between a horizontal operative position and an inclined storage position in which the seat member lies against the mounting bracket, a stay pivotable between an operative position in which said stay extends vertically from the mounting bracket to the seat member in order to support the weight of the seat member on the mounting bracket and a storage position in which said stay lies between the mounting bracket and the seat member, and an operating handle is secured to the stay to project forward from the underside of the seat member.

4. The combination of claim 3, wherein a spring clip and a ball stud are provided for retaining the seat member against the mounting bracket when in the storage position.

5. In an agricultural vehicle having a mobile frame and an operator cab supported on said frame for locating operative controls for the agricultural vehicle, a folding seat in combination with the agricultural vehicle comprising:

a mounting bracket comprising a first plate, to be mounted on a non-horizontal surface in the cab, and a second plate having an inverted "L" shape secured to or formed integrally with the first plate, the second plate having a horizontal limb connected along a rear edge of the second plate to the upper edge of the first plate and a vertical limb extending downwardly from the front edge of the horizontal limb towards the first plate, means for securing the mounting bracket to a non-horizontal surface in the cab, a seat member pivotably mounted at a rear end on the mounting bracket for pivotal movement between a horizontal operative position and an inclined storage position in which the seat member lies against the mounting bracket, and a stay pivotable between an operative position in which said stay extends vertically from the mounting bracket to the seat member in order to support the weight of the seat member on the mounting bracket and a storage position in which said stay lies between the mounting bracket and the seat member.

6. The combination of claim 5, wherein the lower end of the first plate is bent upwardly to form a flange having a recess for receiving and locating the stay in said operative position.

\* \* \* \* \*